US012619448B2

(12) United States Patent
Mone et al.

(10) Patent No.: US 12,619,448 B2
(45) Date of Patent: May 5, 2026

(54) DEFINING ARCHITECTURES USING DECLARATIVE PARAMETRIC LANGUAGE

(71) Applicant: Infinera Corp., Annapolis Junction, MD (US)

(72) Inventors: Thirumala Raju Mone, Bangalore (IN); Santanu Sen, Bangalore (IN)

(73) Assignee: Infinera Corp.

( * ) Notice: Subject to any disclaimer, the term of this patent is extended or adjusted under 35 U.S.C. 154(b) by 0 days.

(21) Appl. No.: 16/415,853

(22) Filed: May 17, 2019

(65) Prior Publication Data

US 2020/0364061 A1 Nov. 19, 2020

(51) Int. Cl.
*G06F 9/44* (2018.01)
*G06F 8/30* (2018.01)
*G06F 9/445* (2018.01)
*G06F 16/22* (2019.01)

(52) U.S. Cl.
CPC ............ *G06F 9/44526* (2013.01); *G06F 8/31* (2013.01); *G06F 16/2228* (2019.01)

(58) Field of Classification Search
None
See application file for complete search history.

(56) References Cited

U.S. PATENT DOCUMENTS

| | | |
|---|---|---|
| 5,187,787 A | 2/1993 | Skeen et al. |
| 5,666,553 A | 9/1997 | Crozier |
| 5,754,849 A | 5/1998 | Dyer |

| | | |
|---|---|---|
| 5,966,531 A | 10/1999 | Skeen |
| 5,987,480 A | 11/1999 | Donohue |
| 6,324,568 B1 | 11/2001 | Diec |
| 6,584,464 B1 | 6/2003 | Warthen |
| 6,711,579 B2 | 3/2004 | Balakrishnan |
| 6,948,117 B2 | 9/2005 | Van Eaton |

(Continued)

FOREIGN PATENT DOCUMENTS

| | | |
|---|---|---|
| EP | 2487600 | 8/2012 |
| EP | 2487601 | 8/2012 |

(Continued)

OTHER PUBLICATIONS

Quan, How to Make a Semantic Web Browser, WWW 2004, May 17-22, 2004, New York, New York, USA, ACM 1-58113-844-X/ 04/0005.

(Continued)

*Primary Examiner* — Insun Kang

(57) ABSTRACT

A method is described in which a processor receives a file containing declarative parametric language. The declarative parametric language is parsed by the processor to generate a data structure. Then, within a binary executable file, at least three software components are combined based upon the data structure. The software components include a component data collector, a feature manager, and a managed object. The component data collector is software configured to collect data from at least one of a hardware component and a software component. The feature manager is software configured to selectively obtain first data from at least one component data collector and provide second data to at least one managed object. The managed object is software configured to expose the second data outside of the binary executable file.

18 Claims, 10 Drawing Sheets

(56) References Cited

U.S. PATENT DOCUMENTS

| | | | |
|---|---|---|---|
| 6,964,034 B1 | 11/2005 | Snow | |
| 6,988,109 B2 | 1/2006 | Stanley | |
| 7,058,671 B2 | 6/2006 | Calvo | |
| 2004/0015783 A1 | 1/2004 | Lennon et al. | |
| 2005/0155027 A1 | 7/2005 | Wei | |
| 2005/0216421 A1 | 9/2005 | Barry et al. | |
| 2006/0031187 A1 | 2/2006 | Pyrce | |
| 2006/0206863 A1 | 9/2006 | Shenfield et al. | |
| 2006/0218563 A1 | 9/2006 | Grinstein | |
| 2006/0236307 A1* | 10/2006 | Debruin | G06F 8/51 |
| | | | 717/117 |
| 2007/0006188 A1* | 1/2007 | Schroth | G06F 8/447 |
| | | | 717/140 |
| 2008/0148157 A1* | 6/2008 | Kamdar | G06F 9/4451 |
| | | | 715/747 |
| 2008/0162565 A1* | 7/2008 | Waguet | G06F 9/542 |
| | | | 715/764 |
| 2009/0013245 A1* | 1/2009 | Cudich | G06F 40/14 |
| | | | 715/234 |
| 2009/0249249 A1* | 10/2009 | Glein | G06F 8/38 |
| | | | 715/810 |
| 2010/0115023 A1 | 5/2010 | Peled | |
| 2010/0162152 A1 | 6/2010 | Allyn | |
| 2010/0281475 A1* | 11/2010 | Jain | G06F 8/658 |
| | | | 717/172 |
| 2010/0325196 A1 | 12/2010 | Beckman et al. | |
| 2011/0035734 A1* | 2/2011 | Liang | G06F 8/31 |
| | | | 717/140 |
| 2011/0071871 A1* | 3/2011 | Wong | G06Q 10/0639 |
| | | | 705/7.22 |
| 2012/0167039 A1* | 6/2012 | Williams | G06F 8/20 |
| | | | 717/107 |
| 2012/0259594 A1 | 10/2012 | Khan | |
| 2012/0296610 A1 | 11/2012 | Hailemariam et al. | |
| 2013/0110838 A1 | 5/2013 | Lidy | |
| 2013/0152041 A1* | 6/2013 | Hatfield | G06Q 10/06 |
| | | | 717/105 |
| 2013/0159970 A1* | 6/2013 | Welicki | G06F 16/185 |
| | | | 717/117 |
| 2014/0089395 A1* | 3/2014 | Atsatt | H04L 67/10 |
| | | | 709/203 |
| 2014/0244623 A1 | 8/2014 | King | |
| 2014/0330899 A1* | 11/2014 | Franco | G06F 9/445 |
| | | | 709/203 |
| 2015/0135160 A1* | 5/2015 | Gauvin | G06F 8/34 |
| | | | 717/109 |
| 2015/0199311 A1* | 7/2015 | Charbonneau | G06Q 30/00 |
| | | | 715/234 |
| 2015/0363175 A1* | 12/2015 | Klausner | G06F 8/34 |
| | | | 717/109 |
| 2016/0054980 A1* | 2/2016 | Nucci | G06F 8/34 |
| | | | 717/105 |
| 2016/0092179 A1* | 3/2016 | Straub | G06F 8/20 |
| | | | 717/107 |
| 2016/0112253 A1* | 4/2016 | Nagarajan | H04L 41/22 |
| | | | 715/734 |
| 2016/0210123 A1* | 7/2016 | Prasanna Kumar | G06F 8/20 |
| 2017/0090875 A1* | 3/2017 | Soffer | G06F 8/38 |
| 2017/0148197 A1* | 5/2017 | Winternitz | G06F 9/451 |
| 2018/0074799 A1* | 3/2018 | Alabes | G06F 16/972 |
| 2018/0239497 A1* | 8/2018 | Hiremath | G06F 9/451 |
| 2018/0307465 A1* | 10/2018 | He | G06F 8/38 |
| 2018/0314780 A1* | 11/2018 | Bertilsson | G06F 8/20 |
| 2018/0330094 A1* | 11/2018 | Goeb | G06F 16/182 |
| 2018/0349108 A1* | 12/2018 | Brebner | H04W 4/80 |
| 2018/0357050 A1* | 12/2018 | Brebner | G06F 8/34 |
| 2019/0332357 A1* | 10/2019 | Reddy | G06F 8/34 |
| 2019/0369971 A1* | 12/2019 | Campbell, IV | G06F 8/76 |
| 2020/0064991 A1* | 2/2020 | William | G06F 9/54 |
| 2020/0097267 A1* | 3/2020 | Olsson | G06F 9/455 |
| 2020/0285788 A1* | 9/2020 | Brebner | G06F 18/251 |
| 2020/0326916 A1* | 10/2020 | Sreenivasan | G06F 8/38 |

FOREIGN PATENT DOCUMENTS

| | | |
|---|---|---|
| WO | WO 2001/015017 | 3/2001 |
| WO | WO 2009/143648 | 12/2009 |
| WO | WO 2012/010510 | 1/2012 |
| WO | WO 2012/138897 | 10/2012 |
| WO | WO 2012/158980 | 11/2012 |

OTHER PUBLICATIONS

Gee, Universal Visualization Platform, Visualization and Data Analysis 2005, Electronic Imaging, SPIE vol. 5669, Feb. 3, 2011, p. 274-283.

* cited by examiner

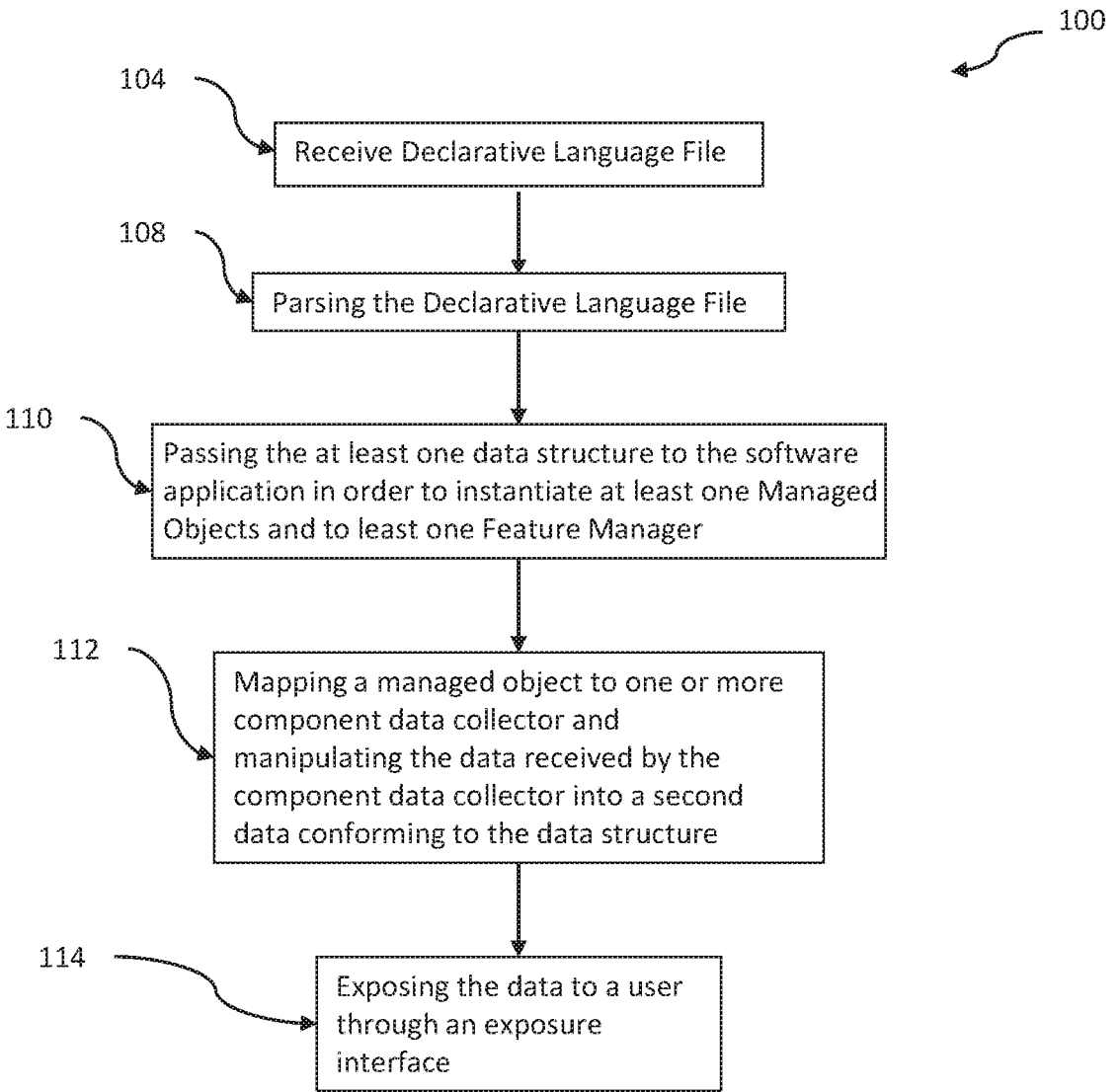

100

104 — Receive Declarative Language File

108 — Parsing the Declarative Language File

110 — Passing the at least one data structure to the software application in order to instantiate at least one Managed Objects and to least one Feature Manager 112 — Mapping a managed object to one or more component data collector and manipulating the data received by the component data collector into a second data conforming to the data structure 114 — Exposing the data to a user through an exposure interface

FIG. 7

DEFINING ARCHITECTURES USING DECLARATIVE PARAMETRIC LANGUAGE

BACKGROUND

As the pace of the development and use of technology increases and expands to new market segments, so too does the demand for hardware that can maintain or surpass the current network capacity need for running the technology. Due to the ever-increasing use of the internet and the need for quick retrieval of large amounts of data, this demand on hardware is especially true in the data network field. Additionally, the ever-changing technology demands on a network service provider require network service providers to add new features or configurations to existing hardware at an ever-increasing rate.

Traditionally, when the capacity of a network node is exceeded thereby creating a bottleneck for data transmissions or when new features or configurations are developed to increase node efficiency or capability, there are three options available to meet these new requirements. The first option is to increase the number of nodes; however, this is not always an efficient solution as increasing the number of nodes can increase the costs of running additional nodes and can decrease efficiencies due to software incompatibilities between the nodes. The second option is to upgrade the node to a newer hardware that can more efficiently handle the demand of the network and eliminate the bottleneck. Upgrading the hardware can be done in at least two ways, adding new hardware components to the device that is already present or replacing the device with another device having new hardware. This hardware replacement solution can also decrease efficiencies due to possible software incompatibilities between the nodes as well as the need to compile and validate new software in order to take advantage of the newly added hardware features. The third option is to update the software running on the network node to more efficiently use the hardware present. The solution of updating the software can, again, increase costs to compile the software and update the device, decrease efficiency between devices running different software, increase validation overhead, and introduce bugs in the code, that is computer code that does not run as expected, does not perform its intended task, or breaks functionality already in place.

The need to add new features and configurations is constant and pressing. Typically, adding a new feature or configuration may require either a replacement of or an update to the software of each node in the system. This kind of update is cost prohibitive to implement on a short timescale and would need to be rolled out over an extended period of time. Because the development of new features and configurations will typically exceed the rollout pace, by the time the new feature or configuration is rolled out to the entire system, an improvement has already been made that needs to be implemented. If any of these improvements break existing compatibility, segments of the network may be inoperable.

What is needed is a method for, without breaking existing functionality, quickly and efficiently adding support for new features and configurations, reducing product development lifecycle, implementing plug-n-play and zero-touch software, and introducing new hardware quickly and efficiently, and a system to implement this method.

SUMMARY

The problem of quickly and efficiently adding support for new features and configurations, reducing product development lifecycle, implementing plug-n-play and zero-touch software, and introducing new hardware quickly and efficiently, all without breaking existing functionality, is solved by parsing declarative parametric language in a file to a declarative language parser. The declarative language parser generates a data structure, and combines, within a software application binary executable file, at least three software components based at least in part upon the data structure. The software modules and the source code are atomized, that is decoupled, which allows single-component restarting. Thus, when any software component is updated or modified, the software component can be restarted independent of the other software components or hardware components providing upgradeability without impacting the up-time of other hardware components or software components. In one embodiment, the software components can be selected from a group consisting of at least one each of a component data collector, a feature manager, and a managed object. The component data collector is software configured to collect data from at least one of a hardware component and a software component. The feature manager is software configured to selectively obtain first data from at least one component data collector and provide second data to at least one managed object. The managed object is software configured to expose the second data outside of the binary executable file. Thus, a new combination of the software components within the binary executable file to provide a new feature or update an existing feature can be accomplished by providing declarative parametric language in a file to a declarative language parser.

BRIEF DESCRIPTION OF SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 7 is a flow diagram showing an exemplary embodiment of a method for providing a new feature or updating an existing feature in the device of FIG. 1, in accordance with the present disclosure.

DETAILED DESCRIPTION

Figure 1:
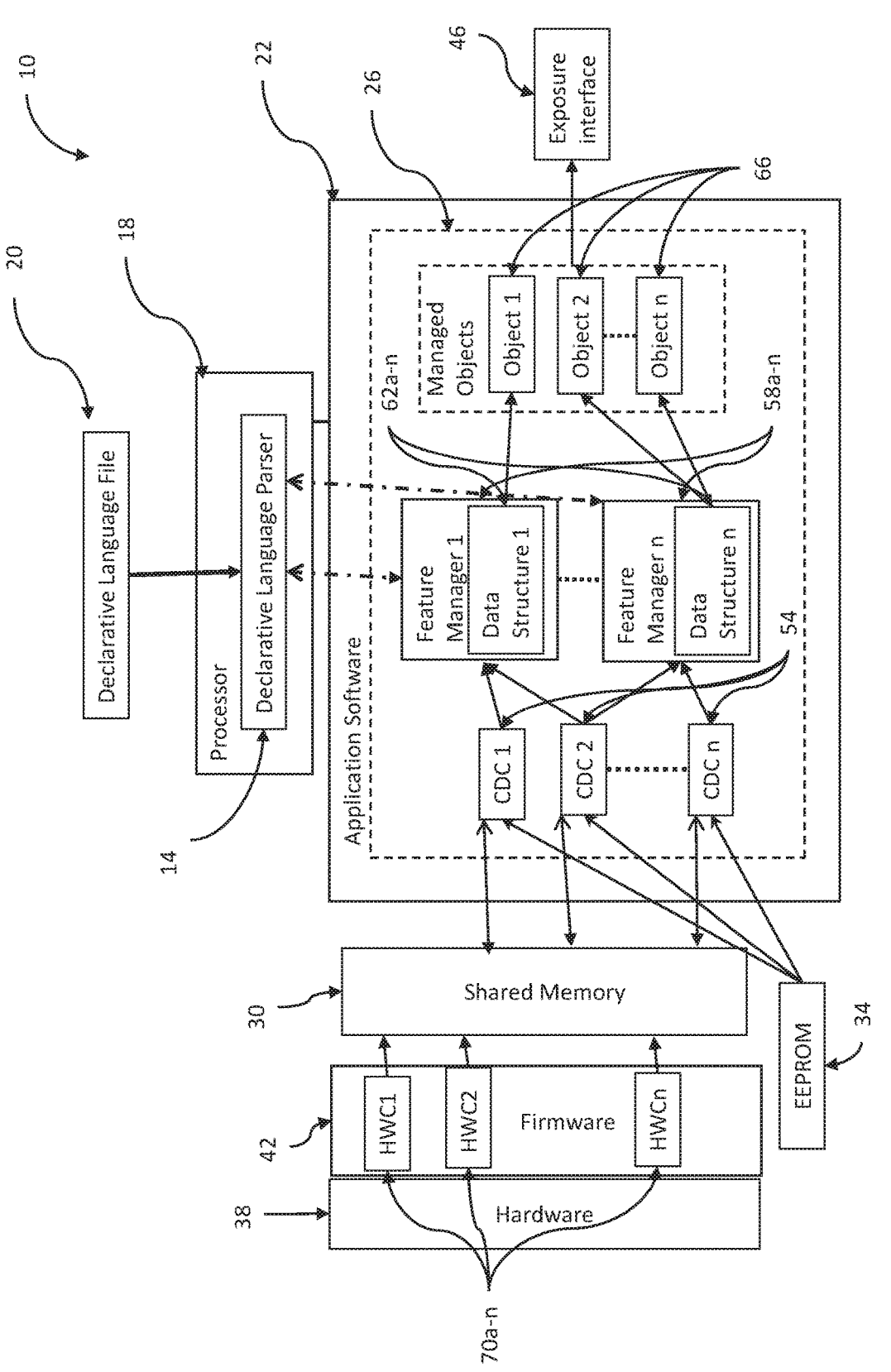
FIG. 1 is a block diagram showing an exemplary embodiment of a device in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. For instance, while this application focuses on using this system in a network services industry, it is recognized that other embodiments may be practiced in other industries, especially industries that require nearly constant device access. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task or set of tasks.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, magnetically based, and/or the like.

In one embodiment, the present disclosure describes a method. In the method, a file is received by a processor associated with a device having at least one hardware component. The file contains declarative parametric language, the declarative parametric language being computer programming code defining a data structure in a human-readable format. The declarative parametric language in the file containing declarative parametric language is parsed by the processor to generate the data structure. Within a binary executable file, at least three software components are combined based at least in part upon the data structure. The software components can be selected from a group consisting of a component data collector, a feature manager, and a managed object, the component data collector being software configured to collect data from at least one of a hardware component and a software component. The feature manager is software configured to selectively obtain first data from at least one component data collector and provide second data to at least one managed object. The managed object is software configured to expose the second data outside of the binary executable file.

In another embodiment, the present disclosure describes a system including a processor, a hardware component, and a non-transitory computer readable medium. The non-transitory computer readable medium stores computer executable instructions that when executed by the processor causes the processor to: receive a file by a processor associated with a device having at least one hardware component. The file contains declarative parametric language. The declarative parametric language is computer programming code defining a data structure in a human-readable format. The processor also parses the file containing declarative parametric language to generate a data structure; and combines, within a binary executable file, at least three software components based at least in part upon the data structure. The software components are selected from a group consisting of a component data collector, a feature manager, and a managed object. The component data collector is software configured to collect a first data from at least one of a hardware component and a software component. The feature manager is software configured to selectively obtain the first data from at least one component data collector and provide a second data to at least one managed object, the managed object being software configured to expose the second data outside of the binary executable file. The problem of quickly and efficiently adding support for new features and configurations, reducing product development lifecycle, implementing plug-n-play and zero-touch software, and introducing new hardware quickly and efficiently, all without breaking existing functionality, is solved with the methods and systems described herein.

Figure 2:
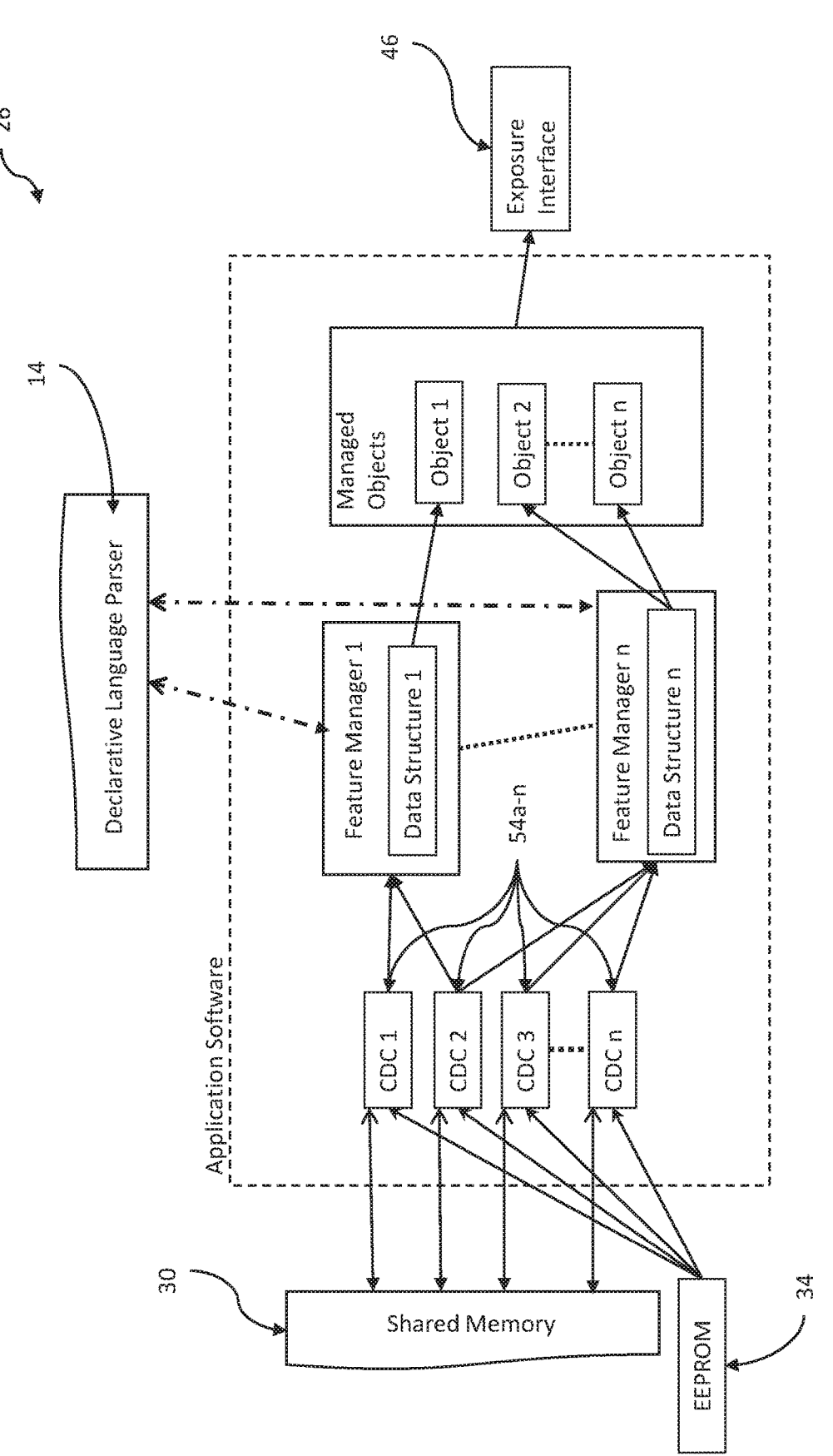
FIG. 2 is a partial, enlarged block diagram of the exemplary embodiment of the device of FIG. 1.

Referring now to the drawings, FIGS. 1 and 2 are block diagrams showing an exemplary embodiment of a declarative language architecture system 10 in accordance with the current disclosure. The declarative language architecture system 10 can be a device designed to operate independently. In one embodiment, the declarative language architecture system 10 can be implemented as a network element for use in a telecommunication system. Exemplary network elements include a reconfigurable optical add/drop multiplexer (ROADM), Fixed optical add/drop multiplexer (FOADM), an optical amplifier card, an optical pluggable module, a switch, or the like.

In general, the declarative language architecture system 10 generally is provided with a declarative language parser 14 executing on (or executable by) a processor 18, a declarative parametric language file 20 (also referred to herein as a file containing declarative parametric language), a non-transitory memory 22, application software 26 in the form of a binary executable file that is executed on the processor 18 and stored on the non-transitory memory 22, a shared memory 30, an EEPROM 34, a hardware element 38, a firmware element 42, and an exposure interface 46. The binary executable of application software 26 generally comprises a plurality of software components that are separate and may or may not be designed to work with one another. When the declarative language architecture system 10 is a network element, the hardware element 38 may be a photodiode, an encoder, an amplifier, a decoder, a multiplexer, a demultiplexer, or the like.

Each of the software components may be designed to operate separately to perform a particular calculation, or a function. Further, at least one or more of the software component can be a reusable software module that has been atomized, i.e., isolated or loosely coupled from previous use in combination with another software module, and configured to be recombined with another software component to provide support for a new or updated requirement.

In one embodiment, the software components include a Component Data Collector 54, a Feature Manager 58, wherein each Feature Manager manages a Data Structure 62, and a managed object 66. In the example shown, the system 10 includes a plurality of the Component Data Collectors 54, a plurality of the Feature Managers 58, wherein each Feature Manager comprises at least one rule specifying an operation or constraint and manages multiple Data Structures 62, and a plurality of managed objects 66. The hardware element 38 comprises a plurality of hardware components 70. The component data collector 54 is configured to obtain data from a hardware component 70, or another software component. The managed object 66 is a software entity that has user visibility, e.g., exposed to a management interface through which a user can perceive the attributes in a user understandable format. Each managed object 66 is associated with, and provides a software representation of a hardware component 70, and receives data from an associated hardware component 70 via at least one component data collector 54. In one embodiment, the managed objects 66 are configured to interact with a Fault Configuration Alarms Performance and Security application. Interfacing, and using managed objects 66 with the Fault Configuration Alarms Performance and Security application are well known in the telecommunication industry.

The declarative parametric language file 20 of declarative language architecture system 10 may be any computer programming code defining a data structure in any human-readable format. A declarative parametric language file in the current disclosure includes any structured computer file format that uses human-readable text to describe data structures or data objects, including, for example XML, JSON, OGDL, YAML, or CSV. Declarative parametric language files may be either language-dependent, that is the interpretation by the processor 18 of the declarative parametric language file 20 is dependent upon the programming language the declarative language file 20 is accessed or assembled with, or language-independent, that is the interpretation by the processor 18 of the declarative parametric language file 20 is independent of the programming language the declarative parametric language file 20 is accessed or assembled with. A configuration file for a new or updated feature may include the declarative parametric language file 20.

The declarative language parser 14 executing on processor 18 is a software component that operates to parse the declarative parametric language file 20 into at least one computer stored and computer accessible data structure 62, discussed further below. The declarative language parser 14 receives the declarative parametric language file 20, parses the declarative parametric language file to identify the Feature Manager 58 that will manage the one or more data structure contained in the declarative parametric language file 20, generates a one-to-one map of each of the data structures 62, and sends each of the data structures 62 to the Feature Manager 58, each of the data structures 62 being defined by parameters within the declarative parametric language file 20 or the predefined configuration file and representing a new or updated feature. The declarative language parser 14 may be present locally with respect to the application software 26, or operate remotely there from and supply the data structure 62 to the feature managers 58 by way of a network, for example. When the declarative language parser 14 is remote from the application software 26, the declarative language parser 14 is located on separate hardware from the non-transitory memory 22 such as operated and managed on the cloud, for example.

As described above, the non-transitory memory 22 includes random access memory, read only memory, flash memory, and/or the like. Such non-transitory computer readable mediums may be electrically based, optically based, magnetically based, and/or the like. The non-transitory memory 22 can be any computer readable medium that can store or access computer readable or executable code.

The application software 26 is a computer readable binary executable that is executed on the processor 18 and is stored on the non-transitory memory 22. The application software 26 may be operated constantly by the processor 18 while the declarative language architecture system 10 is powered on; it may operate only when triggered by the exposure interface 46, discussed below; the application software 26 may be operated by the processor 18 when a Declarative parametric language file 20 is sent to the Declarative Language Parser 14; or the application software 26 may operate in any combination thereof. The application software 26 contains the plurality of Component Data Collectors 54, the plurality of feature managers 58, and the plurality of managed objects 66. The binary executable application software 26 receives at least one data structure 62 from the declarative language parser 14. The binary executable application software 26 then passes the at least one data structure 62 to one or more feature manager 58 for each feature received from the declarative language parser 14. Each of the plurality of feature managers 58 manages at least one data structure 62. Each of the feature managers 58 may be considered an Intelligent Software Entity, that is, each of the feature managers 58 can adapt as needed to accommodate a new hardware element that replaces an original hardware element, the new hardware element having the same hardware components and an equal or unequal quantity of each of the same hardware components as the original hardware element.

Each of the plurality of Component Data Collectors 54 collects a first data for at least one of a hardware component 70 and a software model, the first data being in a data format specified by the EEPROM 34, discussed below. The component data collector 54 collects the first data from the shared memory 30, from the firmware 42, or from any predetermined memory location. The component data collector 54 may operate as a computer thread of execution, that is, it may operate as an independent sequence of programmed computer instructions executed by the processor 18. The Component Data Collector 54 may collect the first data from the shared memory 30 and submit the first data to the Feature Manager 58 after a request from the Feature Manager 58; the Component Data Collector 54 may collect the first data and send the first data to the Feature Manager 58 without a request from the Feature Manager 58 on a scheduled or polling basis, that is, the time between data collections made by the Component Data Collector 54 may be consistent with or determined by the data structure 62; or the Component Data Collector 54 my collect the first data both on a scheduled or polling basis as well as collect the first data at the request of the Feature Manager 58.

Once the feature manager 58 receives or selects the first data from at least one Component Data Collector 54, the feature manager 58 maps the first data into a second data, the second data conforming to the data structure 62 of the feature manager 58. The feature manager 58 may map the first data into the second data by modifying the first data based on complex hierarchies and component relationships. This modification of the first data may be done with any mathematic function defined in the data structure 62, which mathematic function may include mathematically combining the first data from a first component data collector 54 with data from at least one other component data collector 54; combining the first data from a first component data collector 54 with data from a software component; combining the first data from a first component data collector 54 with one or more values stores in the application software 26; or combining the first data from a first component data collector 54 with a predetermined value as defined in the data structure 62. The feature manager 58 then sends the second data to a managed object 66. The managed object 66 exposes the second data to a user through the exposure interface 46. Generally, the Feature Manager 58 may be considered a software application with very lose coupling and strict interfaces, that is, the Feature Manager 58 can support new requirements by reusing data collected by component data collector 54 in new ways based on the declarative parametric language file 20 without recompiling the binary executable application software 26. Because the plurality of software components are individually regressed, that is the software components are loosely coupled to one another, combining any two or more of the plurality of software components in a new combination in the declarative parametric language file 20 to create at least one of new feature manager 58 and data structure 62 substantially reduces validation overhead, reduces the chance of breaking existing functionality, and decreases development time for new features by reusing existing software components.

The shared memory 30 can by any computer memory component that is readable by at least the binary executable application software 26 as well as the component data collectors 54 and writable by at least the firmware 42. The shared memory 30 may also be writable by the binary executable application software 26 and the component data collectors 54. The shared memory 30 may be any non-transitory memory and may, in some embodiments, be an addressed section of the non-transitory memory 22 that also stores the binary executable application software 26.

The EEPROM 34 may be a non-volatile, electrically erasable programmable read only memory component. The EEPROM 34 stores an initialization data for the component data collectors 54. The initialization data contains at least a format for the first data collected by the plurality of component data collectors 54 and a hardware configuration data for the hardware element 38. When the declarative language architecture system 10 is powered on, the EEPROM 34 provides the initialization data for the plurality of component data collectors 54. The initialization data for the component data collectors 54 may be written to or otherwise supplied to the EEPROM 34 during the manufacturing process. The nature of an EEPROM allows for the possibility of replacing or rewriting the data on the EEPROM at a later time to, for example, initialize additional or new component data collectors 54.

By way of example, if a first hardware element 38 contains a first hardware component 70 having two Gain Blocks in a Transmit Direction of the first hardware component 70, a data value '2' will be available at a first location in the EEPROM 34 indicating the quantity of Gain Blocks. When the component data collector 54 is initialized to collect data from the first hardware component 70, the component data collector 54 will read from the first location in the EEPROM 34 and initialize the data structure of a first component data collector 54 with the data value '2', which would instruct the first component data collector 54 to collect data for only two Gain Blocks for the first hardware component 70.

The hardware element 38 comprises the plurality of hardware components 70. Each of the plurality of hardware component 70 is a physical component of the system 10, and may include a machine, wiring, circuitry, or the like. Each hardware component 70 may perform a discrete function. By way of example, if the hardware element 38 is a network element, the plurality of hardware components 70 may comprise any combination of Photo Diodes (PD and associated driver), Raman Amplifier Module, VOA (Variable Optical Attenuator), attenuators, alarms, switches, gain blocks, Fixed Optical Add Drop Multiplexer (FOADM) cards, and Reconfigurable Optical Add Drop Multiplexer (ROADM) cards. Each of the plurality of hardware components 70 may be replaced without causing the binary executable application software 26 to be recompiled, reinstalled, or updated to account for the replacement.

The firmware element 42 is a computer software that provides control, monitoring, and manipulation of the plurality of hardware components 70. An attribute data for each of the plurality of hardware components 70 of hardware element 38 is stored in the shared memory 30 at a specific location determined by the firmware 42. The firmware 42 will execute computer code to cause the shared memory 30 to be updated with the attribute data for each of the plurality of hardware components 70. The attribute data may contain data regarding any measurable value or known aspect of the hardware component 70.

The exposure interface 46 may be any interface that provides a user access to the second data bound to the data structure of the managed object 66. In one embodiment, for example, the exposure interface 46 exposes the second data bound to the data structure of the managed object 66 by way of an Application Programming Interface known in the art as an API. In another embodiment, the exposure interface 46 may be any device that that can communicate an indication, such as a display, that shows information relating to the network node, for example, a status of the network node or a status of the signals coming to or leaving the network node. A user can be, for example, any system, device, apparatus, person, computer, processor, software, or entity external to the declarative language architecture system 10.

FIGS. 3-6 show exemplary non-limiting implementations of the declarative language architecture system 10. It should be understood that the EEPROM 34 is present, but not shown in FIGS. 5 and 6 due to space constraints in such figures.

Figure 3:
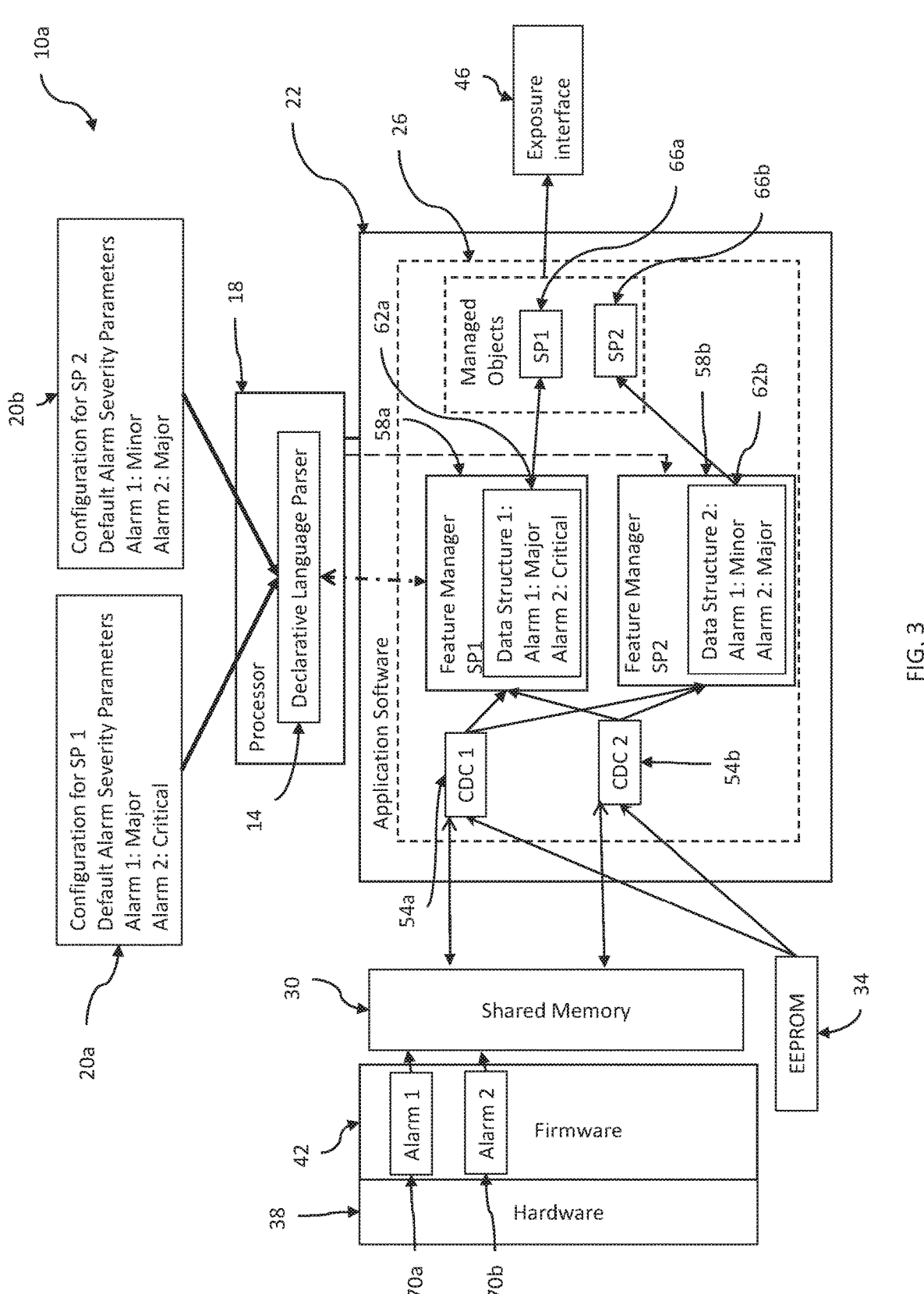
FIG. 3 is a block diagram of the device of FIG. 1 showing an exemplary implementation of an attribute default value specification with conflicting requirements.

In particular, FIG. 3 illustrates a block diagram of an exemplary embodiment of the declarative language architecture system 10 in which two different network segments (operated by two different service providers, i.e., service provider 1 and service provider 2) running the same version of the network element software have a conflicting requirement for a default severity of a specific alarm. In this case, the firmware 42 obtains data from the hardware 38 that is indicative of a trigger for an Alarm 1 70*a*, and an Alarm 2 70*b*. Two declarative parametric language files 20*a* and 20*b* are supplied to the declarative language parser 14. The declarative parametric language file 20*a* specifies a configuration for service provider 1, i.e., that Alarm 1 is considered major, and alarm 2 is considered critical. The declarative parametric language file 20*b* specifies a configuration for service provider 2, i.e., that Alarm 1 is considered minor, and alarm 2 is considered major. The declarative language parser 14 parses the declarative parametric language to form two separate data structures, i.e., data structure 1 62*a*, and data structure 2 62*b*. Data structure 1 62*a* is provided to the feature manager 58*a*, and is used to form a first combination of at least one component data collector 54*a* or 54*b*, the feature manager 58*a*, and the managed object 66*a*. Data structure 2 62*b* is provided to the feature manager 58*b*, and is used to form a second combination of at least one component data collector 54*a* or 54*b*, the feature manager 58*b*, and the managed object 66*b*. Thus, by parameterizing the software components, and creating two separate combinations within the application software 26, the system 10 the requested functionality for the system 10 can be achieved without resorting to the delivery of a new software load but merely with the declaratory language file 20*a* or 20*b* specific to each service provider.

Figure 4:
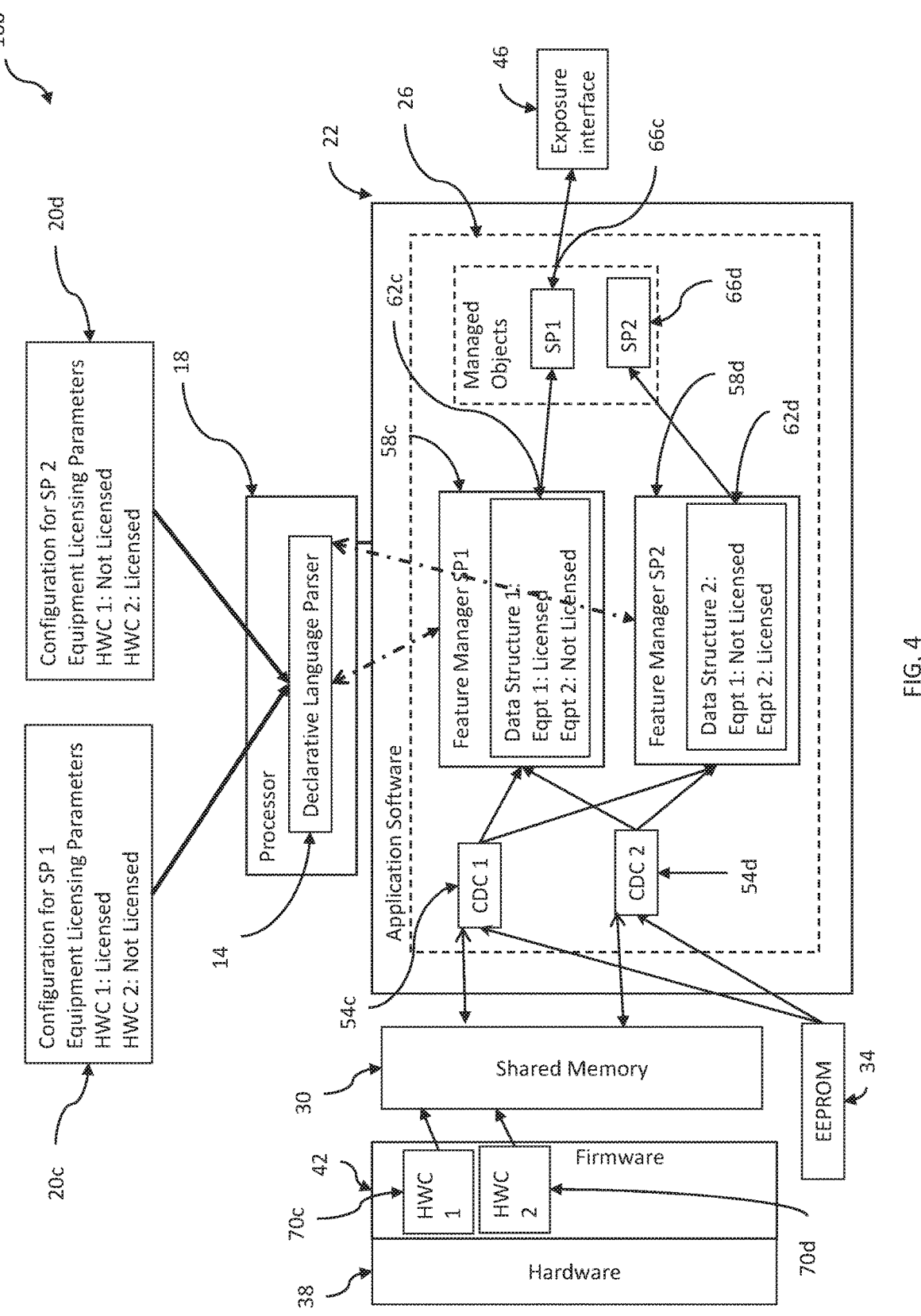
FIG. 4 is a block diagram of an exemplary embodiment of the device of FIG. 1 showing an implementation of a licensing restriction for hardware components.

FIG. 4 illustrates a block diagram of an exemplary embodiment of the declarative language architecture system 10 in which two different network segments (operated by two different service providers, i.e., service provider 1 and service provider 2) running the same version of the network element software have a differing equipment licensing agreement for at least one hardware component 70. In this case, the firmware 42 obtains data from the hardware components 70 that access may be limited via a licensing contract. Two declarative parametric language files 20*c* and 20*d* are supplied to the declarative language parser 14. The declarative parametric language file 20*c* specifies a configuration for service provider 1, i.e., that hardware component 1 70*c* is licensed for use by service provider 1 and hardware component 2 70*d* is not licensed for use by service provider 1. The declarative parametric language file 20*d* specifies a configuration for service provider 2, i.e., that that hardware component 1 70*c* is not licensed for use by service provider 2 and hardware component 2 70*d* is licensed for use by service provider 2. The declarative language parser 14 parses the declarative parametric language to form two separate data structures, i.e., data structure 1 62*c*, and data structure 2 62*d*. Data structure 1 62*c* is provided to the feature manager 58*c*, and is used to determine which, if any, of the plurality of hardware components 70 are licensed for use by service provider 1 70*c*, thereby restricting the feature manager 58*c* from passing a data collected by component data collector 54*d* to managed object 66*c*. Data structure 2 62*d* is provided to the feature manager 58*d*, and is used to determine which, if any, of the plurality of hardware components 70 are licensed for use by service provider 1 70*d*, thereby restricting the feature manager 58*d* from passing a data collected by component data collector 54*c* to managed object 66*d*. Thus, by parameterizing the hardware component licensing parameters and creating two separate combinations within the application software 26, the requested functionality for the system 10 can be achieved without resorting to the delivery of a new software load but merely by passing in the declaratory language file 20*c* or 20*d* specific to each service provider.

Figure 5:
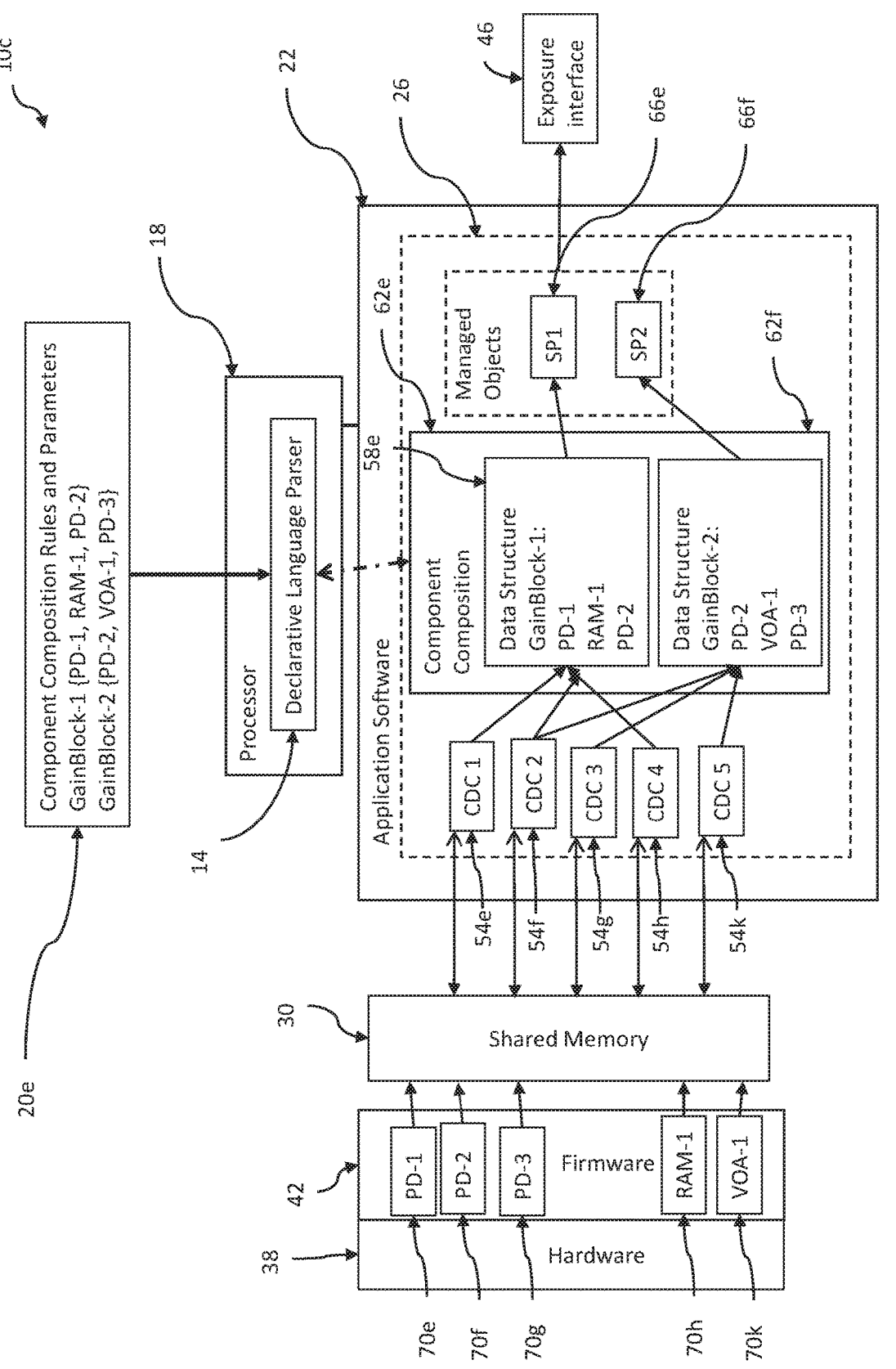
FIG. 5 is a block diagram of an exemplary embodiment of the device of FIG. 1 showing an implementation of a hardware abstraction configuration file.

FIG. 5 illustrates a block diagram of an exemplary embodiment of the declarative language architecture system 10 in which two different hardware or software component composition rules and parameters are defined (a composition rule and parameter for a GainBlock-1 and a composition rule and parameter for a GainBlock-2). In this case, the firmware 42 obtains data from hardware components 70*e*, 70*f*, 70*g*, 70*h*, and 70*k* that form the composition of GainBlock-1 and GainBlock-2. One declarative parametric language file 20*e* is supplied to the declarative language parser 14. The declarative parametric language file 20*e* specifies a data structure 1 62*e* describing a component composition for GainBlock-1 as comprising a PD-1 hardware component 70*e*, a RAM-1 hardware component 70*h*, and a PD-2 hardware component 70*f*, and specifying a data structure 2 62*f* describing a component composition for GainBlock-2 as comprising the PD-2 hardware component 70*f*, a VOA-1 hardware component 70*k*, and a PD-3 hardware component 70*g*. The declarative language parser 14 parses the declarative parametric language to form two separate data structures, i.e., data structure 1 62*e*, and data structure 2 62*f*. Data structure 1 62*e* is provided to the feature manager 58*e*, and is used to form a first combination of a component data collector 54*e*, 54*h*, and 54*f*, and the managed object 66*e*, which described GainBlock-2. Data structure 2 62*f* is provided to the feature manager 58*e*, and is used to form a second combination of a component data collector 54*f*, 54*k*, and 54*g*, and the managed object 66*f*, which describes GainBlock-2. Thus, the GainBlock-1 managed object 66*e* can be exposed through the exposure interface 46 or can be reused in any other feature manager 58. Thus, by parameterizing the component composition rules and parameters and creating two separate combinations within data structures 62*e* and 62*f* within the application software 26, the requested functionality for the system 10 can be achieved without resorting to the delivery of a new software load but merely by passing in the declaratory language file 20*e* describing the new or updated components.

Figure 6:
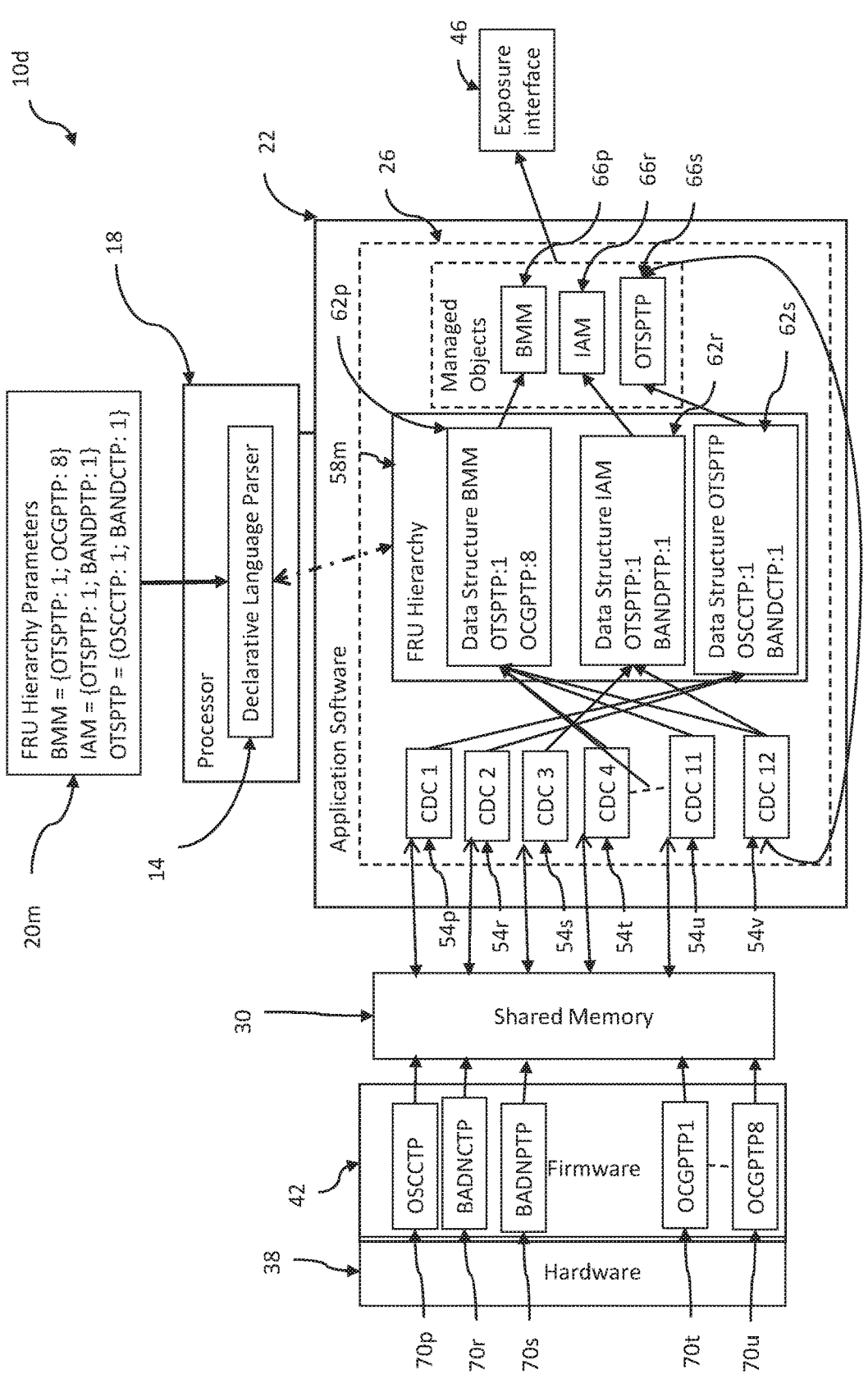
FIG. 6 is a block diagram of an exemplary embodiment of the device of FIG. 1 showing an implementation of managed object modeling.

FIG. 6 illustrates a block diagram of an exemplary embodiment of the declarative language architecture system 10 in which a field replaceable unit hierarchy is defined through object modeling. In this case, the firmware 42 obtains data from hardware components 70*p*, 70*r*, 70*s*, 70*t*, and 70*u* that form the composition of a Band Mux Module (BMM), an Infinera Amplifier Module (IAM), and an Optical Termination Section Physical Termination Point (OT-SPTP). One declarative parametric language file 20*m* is supplied to the declarative language parser 14. The declarative parametric language file 20*m* specifies a first field replacement unit component data structure BMM 62*p* describing a component composition for the BMM as comprising as OTSPTP software component 66*s* and eight Optical Carrier Group Physical Termination Point OCGPTP hardware components 70*t-u*, a second field replacement unit component data structure IAM 62*r* describing a component composition for the IAM as comprising one OTSPTP software component 66*s* and a BAND Physical Termination Point (BANDPTP) hardware component 70*s*, and a third field replacement unit component data structure OTSPTP 62*s* describing a component composition for the IAM as comprising one Optical Supervisory Channel Connection Termination Point (OSCCTP) hardware component 70*c* and one BAND Connection Termination Point (BANDCTP) hardware component 70*r*. The declarative language parser 14 parses the declarative parametric language to form three separate data structures, i.e., data structure BMM 62*p*, data structure IAM 62*r*, and data structure OTSPTP 62*s*. Data structure BMM 62*p* is provided to the feature manager 58*m*, and is used to form a first combination of a component data collector 54*t-u* and 54*v*, and the managed object 66*p*. Data structure IAM 62*r* is provided to the feature manager 58*m*, and is used to form a second combination of a component data collector 54*s* and 54*v*, and the managed object 66*r*. Data structure OTSPTP 62*s* is provided to the feature manager 58*m*, and is used to form a third combination of a component data collector 54*p* and 54*r*, and the managed object 66*s*. In this manner, both the data structure BMM and the data structure IAM utilize the OTSPTP managed object 66*s*. Thus, by parameterizing the field replaceable units and creating three separate combinations within data structures 62*p*, 62*r*, and 62*s* within the application software 26, the requested functionality for the system 10 can be achieved without resorting to the delivery of a new software load but merely by passing in the declaratory language file 20*m* describing the new or updated components that may or may not use a component data collector 54 that collects a data from a managed object 66.

FIG. 7 illustrates a flow diagram 100 showing an exemplary embodiment of a method for providing a new feature or updating an existing feature in the device of FIG. 1 in accordance with the present disclosure. The method 100 generally comprises the steps of receiving the declarative parametric language file (step 104), parsing the declarative parametric language file (step 108), passing the at least one data structure to the software application in order to instantiate at least one managed object and passing the at least one data structure to at least one feature manager (step 110), mapping at least one managed object to at least one component data collector and manipulating the first data received by the at least one component data collector into a second data conforming to the data structure (step 112), and exposing the second data to a user through an exposure interface (step 114). In one embodiment, differing data structures may be processed at different steps in this method at the same time. For example, as the declarative parametric language file is being parsed in step 108 into a plurality of data structures, a first data structure that has been completely parsed may be sent to the software application (step 110) while the parser continues to parse the remainder of the declarative parametric language file (step 108). Additionally, the managed object and the at least one component data collector may be mapped conforming to the first data structure (step 112), while a second data structure is being passed to the software application (step 110), and the parser continues to parse the declarative parametric language file (step 108).

Figure 8:
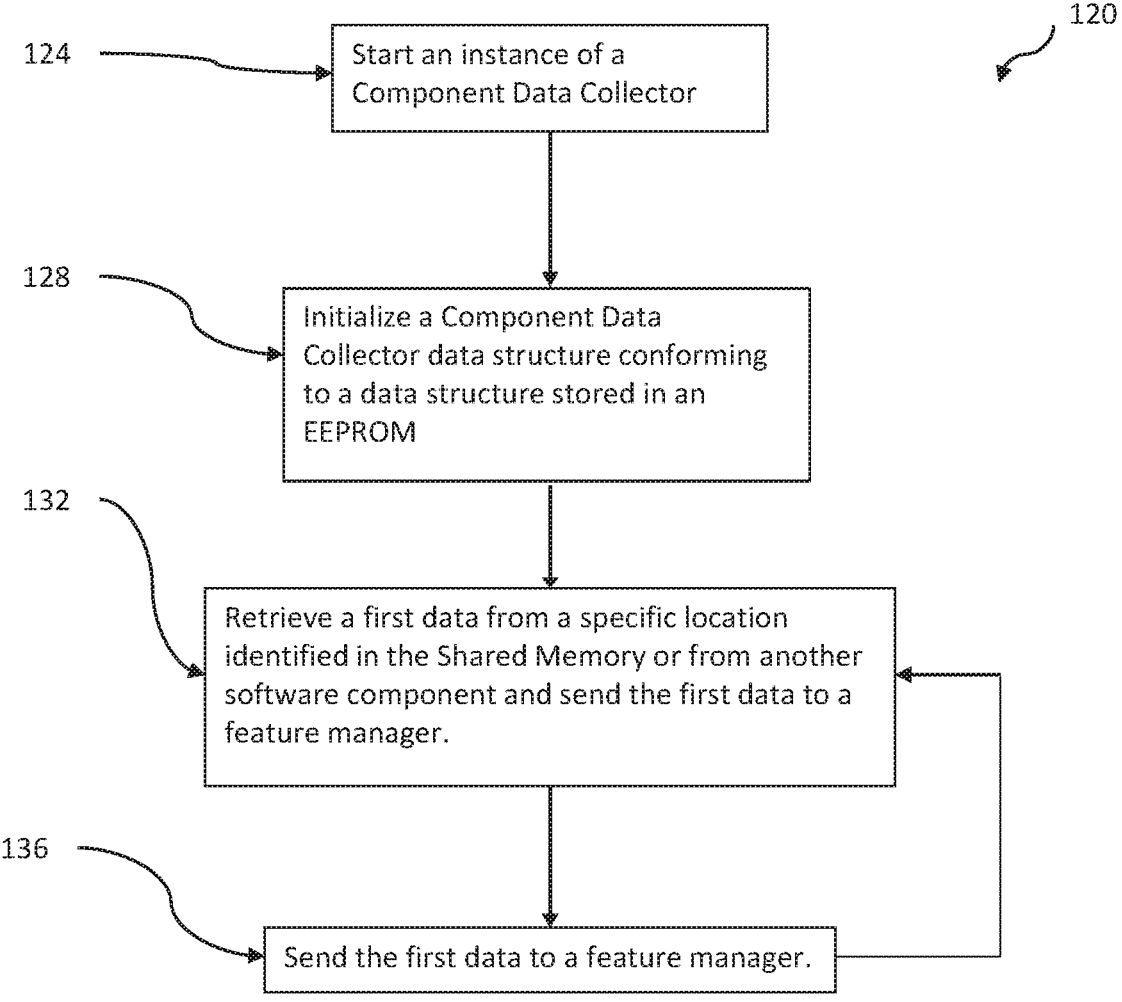
FIG. 8 is a flow diagram showing an exemplary embodiment of a process for instantiating a Component Data Collector in accordance with the present disclosure.

FIG. 8 illustrates a flow diagram 120 showing an exemplary embodiment of a process for instantiating a Component Data Collector in accordance with the present disclosure. The process generally comprises the steps of starting at least one component data collector for each of a plurality of hardware components (step 124), initializing a component data collector data structure conforming to a data structure stored in an EEPROM for each of the at least one component data collector (step 128), retrieving a first data from a specific location in a shared memory, the specific location being specified in the data stored in the EEPROM, or from a software component (step 132), and sending the first data to a feature manager (step 136).

Figure 9:
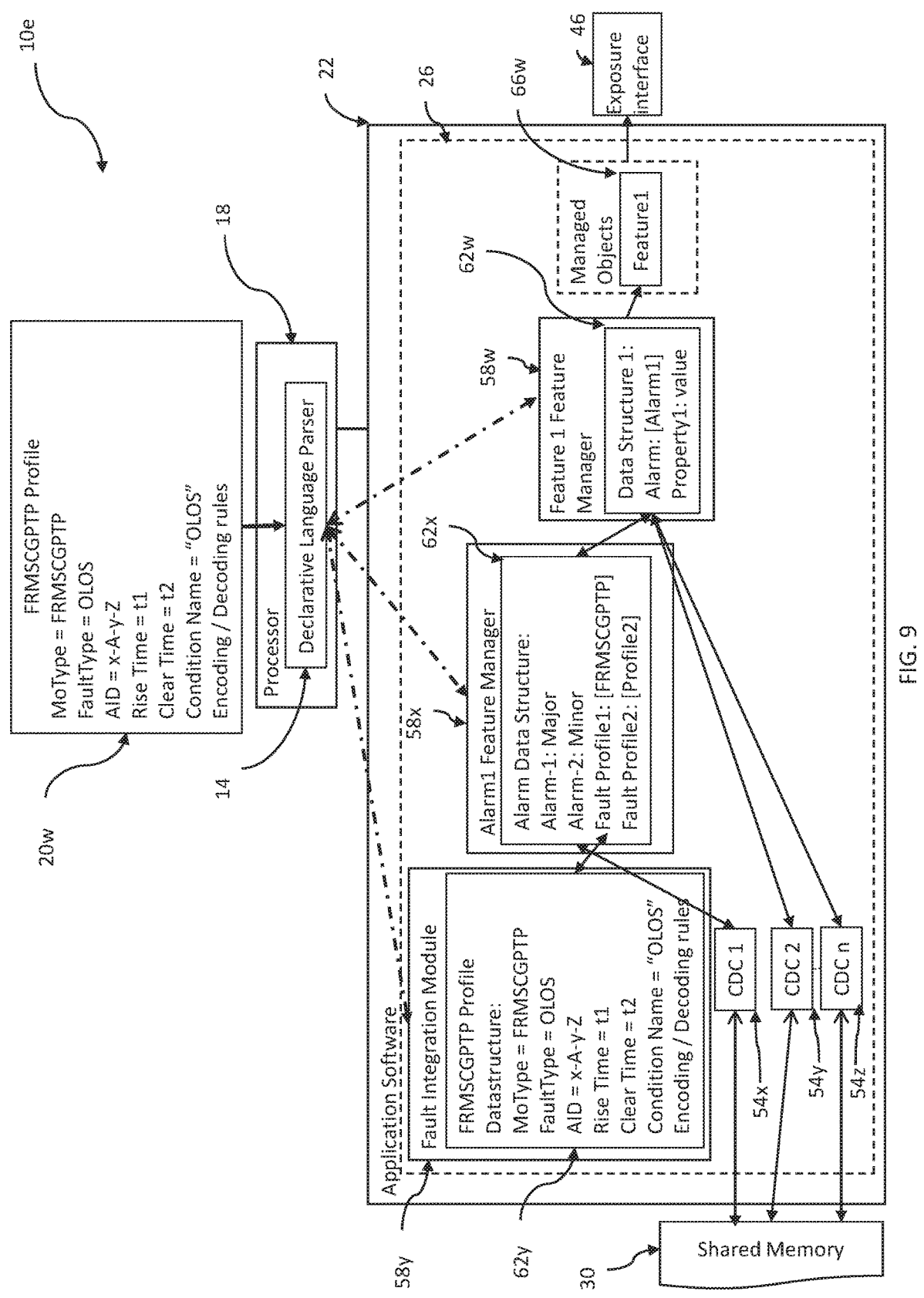
FIG. 9 is a block diagram of an exemplary embodiment of the device of FIG. 1 showing an implementation of a declarative parametric fault integration module.

FIG. 9 illustrates a block diagram of an exemplary embodiment of the declarative language architecture system 10 in which a declarative parametric fault integration module is updated. In this embodiment, a declarative parametric language file 20*w* containing a profile configuration for a fault integration module is supplied to the declarative language parser 14. The declarative language parser 14 parses the declarative parametric language file 20*w* to create a FRMSCGPTP Profile data structure 62*y* and sends the data structure 62*y* to a Fault Integration Module Feature Manager 58*y*. A first data structure 62*w* of a first feature manager 58*w* has an alarm property defined by an alarm data structure 62*x* of an alarm feature manager 58*x*, the alarm property of the first data structure being mapped to the alarm data structure of the alarm feature manager, and may have additional properties that may be mapped to any of the plurality of component data collectors 54. The alarm data structure has a fault profile, the fault profile being mapped to the Fault Integration Module Feature Manager 58*y* and having a data structure of the FRMSCGPTP Profile data structure 62*y*. The alarm data structure may have further properties such as alarm definitions as discussed above in FIG. 3 and may be connected to at least one component data collector 54. In this way, the first managed object 66*w* can be exposed through the exposure interface 46 or can be reused in any other feature manager 58. Thus, by parameterizing the fault integration module profile and referencing that profile in other features, the requested functionality for the system 10 can be achieved without resorting to the delivery of a new software load but merely by passing in the declaratory language file 20*w* describing the new or updated fault integration module profile.

Figure 10:
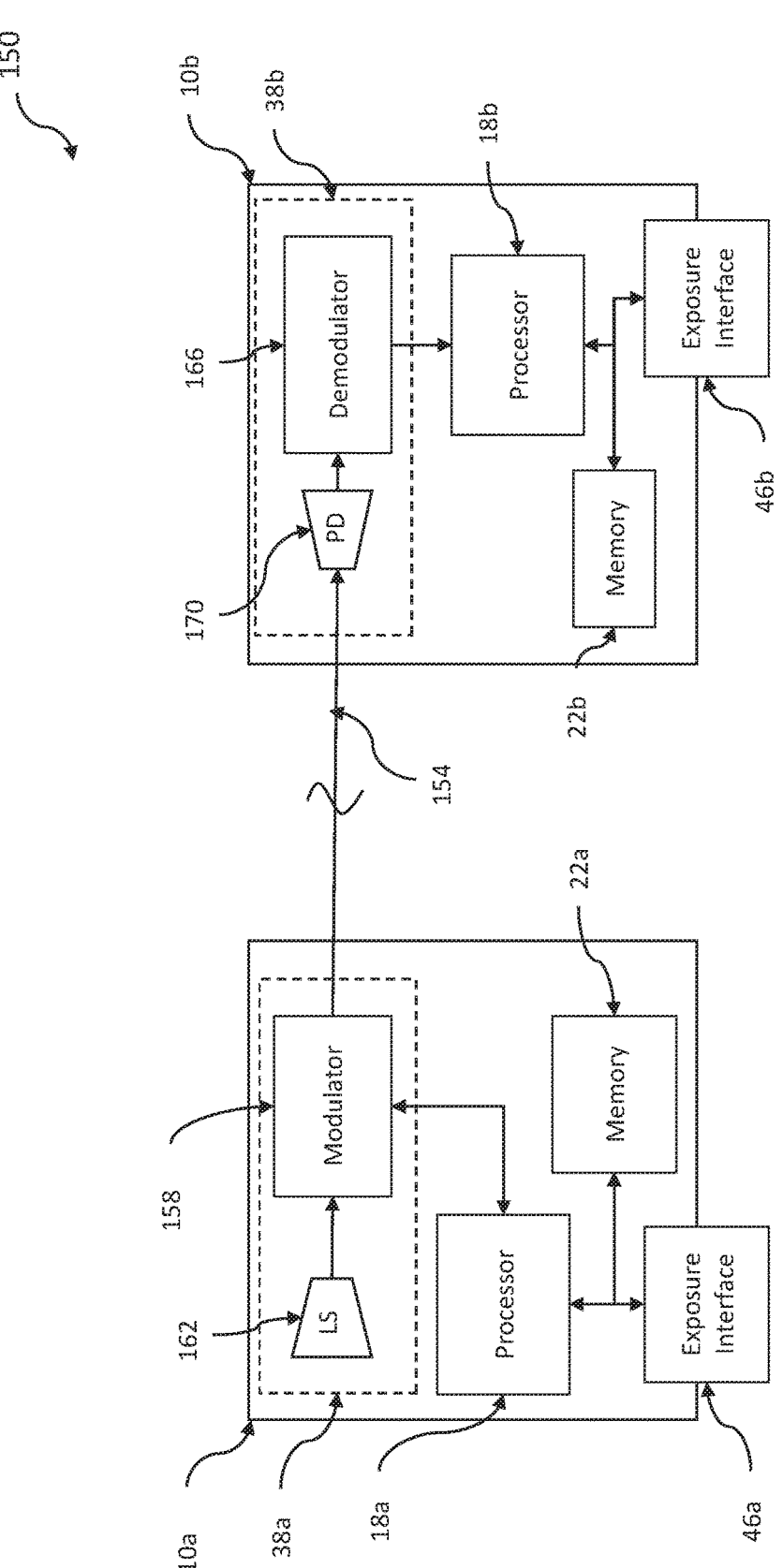
FIG. 10 is an exemplary embodiment of a telecommunication network including declarative language architecture systems communicating over an optical fiber network in accordance with the present disclosure.

Referring now to FIG. 10, shown therein is an exemplary embodiment of a telecommunication network 150 including two declarative language architecture systems 10a and 10b constructed in accordance with the current disclosure. The declarative language architecture systems 10a and 10b may be constructed similarly to the declarative language architecture system 10 described above.

In this embodiment, the declarative language architecture systems 10a and 10b are network nodes that communicate optically over an optical fiber network 154. The optical fiber network 154 includes one or more optical fibers, as well as any intervening network nodes, such as a ROADM node, or the like. In this example, the declarative language architecture system 10a is configured as a transmitter and may include additional elements/functionality to be a receiver as well. The declarative language architecture system 10a contains at least a processor 18a, a non-transitory memory 22a, an exposure interface 46a, as well as a hardware element 38a having hardware components 70 in the form of a modulator 158, and a light source 162 When the declarative language architecture system 10a has more than one modulator 158 and/or light source 162, the hardware element 38a may also include a multiplexer (not shown). The modulator 158 is electrically connected to the processor 18a, and is controlled by the processor 18a in accordance to the computer executable code, such as the application software 26, stored in the non-transitory memory 22a, and modulates light originating in the light source 162 before the light enters the optical fiber network 154. The declarative language architecture system 10b contains at least a processor 18b, a memory 22b, an exposure interface 46b, and a hardware element 38b having hardware components 70 including a demodulator 166 and a photo diode 170. An optical signal is received by the photo sensor 170 (such as a photodiode). The photo sensor 170 converts the optical signal into an electrical signal, and then forwards the electrical signal to the demodulator 166. The demodulator 166 and the photodiode 170 are connected to the processor 18b. The processor 18b receives the signal from the demodulator 166 and processes the signal as determined by the computer executable code, such as the application software 26, stored in the non-transitory memory 22b. The processor 18b is also electrically connected to the demodulator 166 and controls the demodulator 166 in accordance to the computer executable code stored in the non-transitory memory 22b. A transmitter section of declarative language architecture system 10a and a receiver section of declarative language architecture system 10b are shown for simplicity, however, it is understood that each network node may contain multiple transmitter and receiver sections and that there may be a plurality of network nodes interconnected. Further, it is understood that there may be a plurality of connections between each network node and any other network node. In this case, declarative language files can be provided to the declarative language parsers 14 running on the processors 18a and 18b to modify, monitor, or change the functionality of hardware components 70, such as the modulator 158 and demodulator 166 to modify a protocol or other feature of the optical signals transmitted from the declarative language architecture system 10a to the declarative language architecture system 10b, in accordance with the present disclosure described above.

The problem of quickly and efficiently adding support for new features and configurations, reducing product development lifecycle, implementing plug-n-play and zero-touch software, and introducing new hardware quickly and efficiently, all without breaking existing functionality, is solved by the declarative language architecture system and method for implementing the declarative language architecture system as described above. The software components of the declarative language architecture system are atomized, that is the software components are loosely coupled, and can be created or reused as needed. Thus, a new combination of the software components within the binary executable file to provide a new feature or update an existing feature can be accomplished by providing declarative parametric language in a file to a declarative language parser without having to recompile the binary executable file.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A method, comprising:

receiving a file by a processor associated with a device having at least one hardware component, the file containing declarative parametric language, the declarative parametric language being computer programming code defining a data structure in a human-readable format, the data structure being one of a plurality of data structures;

parsing the declarative parametric language in the file containing declarative parametric language, by a declarative language parser running on the processor, to generate the data structure;

combining, within a binary executable file, at least three software components based at least in part upon the data structure, the at least three software components including a component data collector, a feature manager, and a managed object, the component data collector being a software component of the binary executable file configured to collect first data from at least one of the at least one hardware component and a software component, the feature manager being a software component of the binary executable file configured to selectively obtain first data from the component data collector and provide second data to the managed object, the managed object being a software component of the binary executable file configured to expose the second data outside of the binary executable file, the at least three software components being regressed, wherein the feature manager modifies the selectively obtained first data by combining the selectively obtained first data with third data to provide the second data, the third data being based on a mathematical function associated with the data structure; and generating, with the declarative language parser, a one-to-one map of each of the plurality of data structures.

2. The method of claim 1, wherein the data structure has at least one mapped property and at least one exposed property, the mapped property comprising an identifier of one or more Component Data Collector for collecting the first data, and the exposed property comprising a data structure for exposing the second data.

3. The method of claim 1, wherein the data structure has at least one mapped property and at least one exposed property, the mapped property comprising an identifier of one or more Component Data Collector for collecting the first data, and the exposed property comprising a data structure for exposing the second data.

4. The method of claim 1, wherein the device is a network node.

5. The method of claim 1, wherein the declarative parametric language in the file specifies a schema for the second data, and wherein the second data conforms with the schema.

6. The method of claim 1, wherein collecting data includes collecting data from a firmware component, the firmware component being an intermediary between the at least one hardware component and the software components.

7. The method of claim 1, wherein exposing the second data outside the binary executable file includes exposing the second data to an exposure interface of the device.

8. The method of claim 1, further comprising:

receiving, by the processor from an EEPROM, an initialization data for the component data collector having at least a data format for the first data and a hardware configuration data for the at least one hardware component; and wherein combining the at least three software components includes the component data collector being software configured to collect first data from at least one of the hardware component and the software component, wherein the first data has the data format.

9. The method of claim 1, wherein receiving a file by a processor associated with a device having at least one hardware component includes the at least one hardware component comprising one or more of: a photo diodes and associated driver, a Raman amplifier module, a variable optical attenuator, a gain block, a fixed optical add drop multiplexer card, and a reconfigurable optical add drop multiplexer card.

10. A system, comprising:

a processor;

a hardware component; and a non-transitory computer readable medium storing computer executable instructions that when executed by the processor causes the processor to:

receive a file containing declarative parametric language, the declarative parametric language being computer programming code defining a data structure in a human-readable format, the data structure being one of a plurality of data structures;

parse, with a declarative language parser running on the processor, the file containing declarative parametric language to generate the data structure; and combine, within a binary executable file, at least three software components based at least in part upon the data structure, the software components including a component data collector, a feature manager, and a managed object, the component data collector being a software component of the binary executable file configured to collect a first data from at least one of the hardware component and a software component, the feature manager being a software component of the binary executable file configured to selectively obtain the first data from the component data collector and provide a second data to the managed object, the managed object being a software component of the binary executable file configured to expose the second data outside of the binary executable file, the at least three software components being regressed, the declarative language parser generating a one-to-one map of each of the plurality of data structures, wherein the feature manager modifies the selectively obtained first data by combining the selectively obtained first data with third data to provide the second data, the third data being based on a mathematical function associated with the data structure.

11. The system of claim 10, wherein the data structure includes a first identifier identifying the component data collector, a second identifier identifying the feature manager, and a third identifier identifying the managed object, and at least one of a rule and parameter, the rule or parameter specifying an operation or constraint.

12. The system of claim 10, wherein the data structure has at least one mapped property and at least one exposed property, the mapped property comprising an identifier of at least one Component Data Collector for collecting the first data, and the exposed property comprising a data-structure for exposing the second data.

13. The system of claim 10, wherein the device is a network element.

14. The system of claim 10, wherein the declarative parametric language in the declarative parametric language file specifies a schema for the second data, and wherein the second data conforms with the schema.

15. The system of claim 10 further comprising a firmware component and the at least one component data collector, the firmware component being a second non-transitory computer readable medium storing computer executable instructions that when executed by the processor causes the processor to collect a hardware data from each of the hardware components and store the hardware data to a shared memory location, the shared memory location being a location in memory that can be accessed by both the firmware component and the software component, and the at least one component data collector being software further configured to collect data from a shared memory location.

16. The system of claim 10 further comprising an exposure interface comprising a display, the display being configured to show the second data bound to the data structure of the managed object.

17. The system of claim 10, further comprising:

an EEPROM storing an initialization data for the component data collector having at least a data format for the first data and a hardware configuration data for the hardware component; and wherein the component data collector is further configured to collect first data from the hardware component, the first data has the data format.

18. The system of claim 10, wherein the hardware component comprises one or more of: a photo diodes and associated driver, a Raman amplifier module, a variable optical attenuator, a gain block, a fixed optical add drop multiplexer card, and a reconfigurable optical add drop multiplexer card.

* * * * *